(12) United States Patent
Liu

(10) Patent No.: US 7,623,271 B2
(45) Date of Patent: Nov. 24, 2009

(54) AUTOMATIC GRAINY NOISE CONTROL FOR OPTIMAL MACRO UNIFORMITY APPEARANCE

(75) Inventor: Chu-heng Liu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 602 days.

(21) Appl. No.: 11/450,540

(22) Filed: Jun. 9, 2006

(65) Prior Publication Data

US 2007/0286513 A1    Dec. 13, 2007

(51) Int. Cl.
*H04N 1/409* (2006.01)
*G06T 5/00* (2006.01)

(52) U.S. Cl. .................. 358/3.21; 358/3.26; 382/275

(58) Field of Classification Search ............. 358/1.9, 358/3.26, 504, 406, 461, 463, 3.06, 3.21, 358/3.27; 347/14, 19, 10, 132; 399/15, 49, 399/72; 382/275
See application file for complete search history.

(56) References Cited

U.S. PATENT DOCUMENTS 7,283,143 B2 * 10/2007 Mizes et al. ................. 347/132
7,357,473 B2 *  4/2008 Arazaki ....................... 347/15

* cited by examiner

*Primary Examiner*—Scott A Rogers
(74) *Attorney, Agent, or Firm*—Matthew F. Lambrinos; Kermit D. Lopez; Luis M. Ortiz

(57) ABSTRACT

A system's intrinsic mottle & graininess levels are either measured or predicted based on the knowledge of system states including material states and actuator states. The optimal amount of total graininess is then calculated based on established visual models or customer surveys. The difference between this optimal graininess and the machine's intrinsic graininess is then used to calculate the required addition of grainy noise to the print. This additional amount of grainy noise can be added to the print either through textured halftone screens or through noise injection into the input digital (contone) image.

15 Claims, 6 Drawing Sheets

$$A_{NOISE\,1}^2 + A_{NOISE\,2}^2 = A_{TOTAL}^2 \quad \text{—202}$$

AUTOMATIC GRAINY NOISE CONTROL FOR OPTIMAL MACRO UNIFORMITY APPEARANCE

TECHNICAL FIELD

Embodiments are generally related to image processing. Embodiments are also related to the field of digital image data printing. Embodiments are additionally related with noise injection into a final print to optimize macro uniformity appearance.

BACKGROUND OF THE INVENTION

Many processes and devices have been used in image processing for digital printing. The acceptance of electrostatic graphic print engines by the graphic arts and commercial print market has heretofore been hampered by various problems, such as mid-tone non-uniform appearance, which includes streaks, banding, graininess and mottle. The image noises at various spatial frequencies, namely graininess & mottle, are of particular interests to this application. In particular, the relative amplitudes of the image noises at different frequencies are adjusted to optimize the visual uniformity of a print.

Ideally, it is desired to eliminate the image noise at all frequencies. But current electrostatic printing technology still leaves a significant amount of noises at various frequencies, which leads to quite objectionable graininess and mottle (blotchy) appearance.

Visual masking is a well known phenomenon that some visual effects are less noticeable in the presence of some other more visually dominant features. Some image processing methods are taking advantages of this phenomenon by using noises to mask out moire, banding and contouring. Another particular example is the visual masking of mottle by graininess: image mottle (low frequency variation) perception improves as the image graininess increases. Therefore, there is an opportunity to optimize the overall uniformity (combining both mottle & graininess) by adjusting the levels of noises at different frequencies. Although it is difficult to lower the system noise, it is possible to increase the noise levels at pre-selected frequencies to achieve the desired visual optimization.

Some image processing methods have been used based on this technology, in which one method injects noise in halftone threshold array rather than directly into the image. The method operates by creating a halftone threshold array of suitable size to support the desired noise characteristics. A texture pattern of corresponding size is created having the desired noise characteristics and boundary transitions. The texture pattern is applied to the halftone threshold array by an amount determined by a noise amplitude control curve. The incoming contone image is then processed with the modified halftone image.

A typical approach in the past has been for introducing certain amount of high frequency grainy noise present on a print to improve the uniformity appearance of prints by partially masking out low frequency noises such as mottle, however, the optimal amplitude of the grainy noise needed on a print depends on the amplitude of the mottle noise. The higher the mottle noise, the greater amount of grainy noise is required. Depending on the system (machine & material) states, some system prints can show a big range of mottle performances (noise level can vary by more than 70%). Therefore, the grainy noise that is optimal for one state is either too much or too little for other machine states and a compromise must be made.

Therefore, as discussed above, there exists a need for an arrangement and methodology which will improve the adaptivity of the noise injection methods through halftone threshold array and other type of image processing. Thus, it would be desirable to solve this and other deficiencies and disadvantages as discussed above, with an improved feedback and feed forward system in which noise injection is being incorporated into the final print to optimize its uniformity appearance by introducing noise injection into the input digital image.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for improved image processing.

It is another aspect of the present invention to provide noise injection into a final print to optimize its uniformity appearance.

It is a further aspect of the present invention to provide for a certain amount of high frequency grainy noise present on a print for improving the uniformity appearance of prints by partially masking out the low frequency noises such as mottle.

The aforementioned aspects and other objectives and advantages can now be achieved as described herein disclosed is a method to mask certain image defects through introduction of noise. In particular, high frequency graininess is injected to mask the appearance of low frequency mottle. The amount of injected noise is determined from a measure of the current machine state (of noise production) and a calibration curve, function or database that provides the viewer preference for various noise conditions. Such a calibration can be determined in a survey process. The noise can be injected directly into an image or into the halftone threshold array. The noise is added in a gray-level dependent manner. The current machine state of noise production can either be directly determined through noise measurements on prints, or indirectly measured, through means such as monitoring the state of marking materials.

An associated feedback feed forward system is also described for noise injection into a final print to optimize its uniformity appearance. System intrinsic mottle & graininess levels are either measured or predicted based on the knowledge of system states including material states and actuator states. An optimal amount of total graininess is then calculated based on established visual models or customer surveys. The difference between this optimal graininess and the machine's intrinsic graininess is then used to calculate the required addition of grainy noise to the print. This additional amount of grainy noise can be added to the print either through textured halftone screens or through noise injection into the input digital (contone) image. Visual masking is a well known phenomenon; the difference here is controlling the grainy noise level based on the mottle level or an indicator that correlates with mottle.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
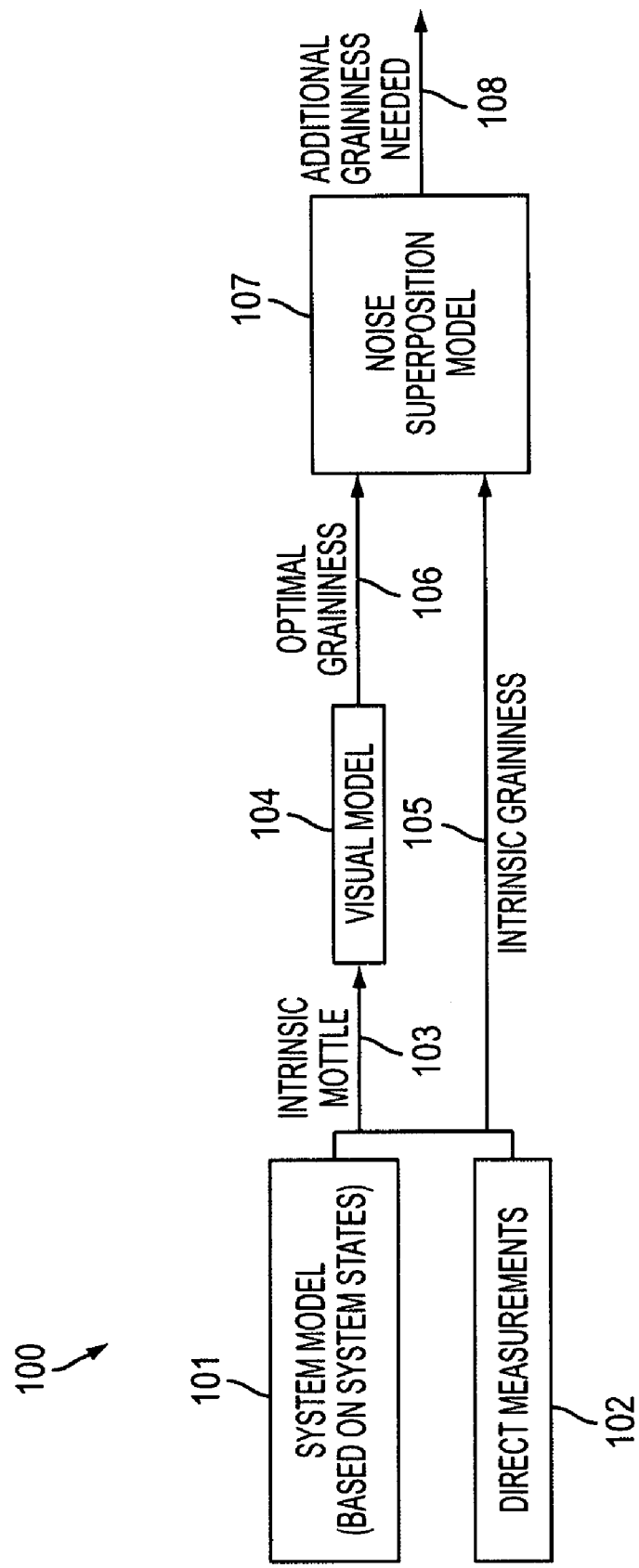
FIG. 1 illustrates a block diagram of a system for obtaining system's intrinsic mottle and graininess with automatic grainy noise control for optimal macro uniformity appearance in which a preferred embodiment can be implemented.

Referring now to the drawings and in particular to FIG. 1, there is depicted a block diagram of a system 100 for obtaining intrinsic mottle and graininess with automatic grainy noise control for optimal macro uniformity appearance of prints in which a preferred embodiment can be implemented. System 100 includes system model 101 that is based on system states. To obtain the optimal appearance, a system's intrinsic mottle 103 and optimal graininess 106 levels, without any intentional noise injection, are obtained through either direct measurements 102 or inferred through system IQ model 101 based on the visual model 104 that incorporates both mottle and graininess. If the obtained level is lower than the intrinsic graininess 105, then no extra noise is added. If the optimal graininess is greater than the intrinsic graininess, a noise superposition model 107 is then used to figure out the amount of the additional grainy noise if needed 108. Since the noise pattern added through the image path has no correlation to the machine's intrinsic noise pattern, the amplitudes of these two noise patterns add up orthogonally.

Figure 2:
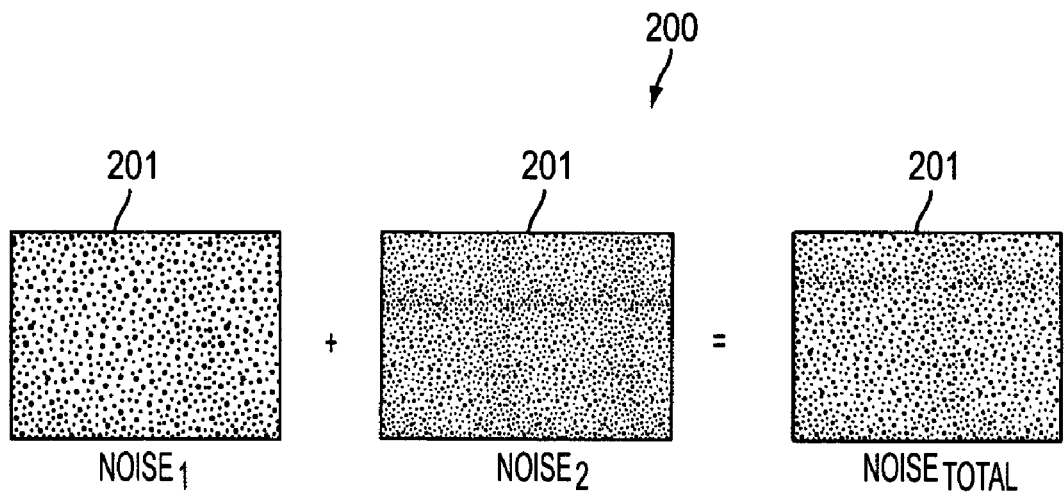
FIG. 2 illustrates a graphical representation of the superposition of two uncorrelated noises for automatic grainy noise control for optimal macro uniformity appearance in which a preferred embodiment can be implemented.
Figure 2:
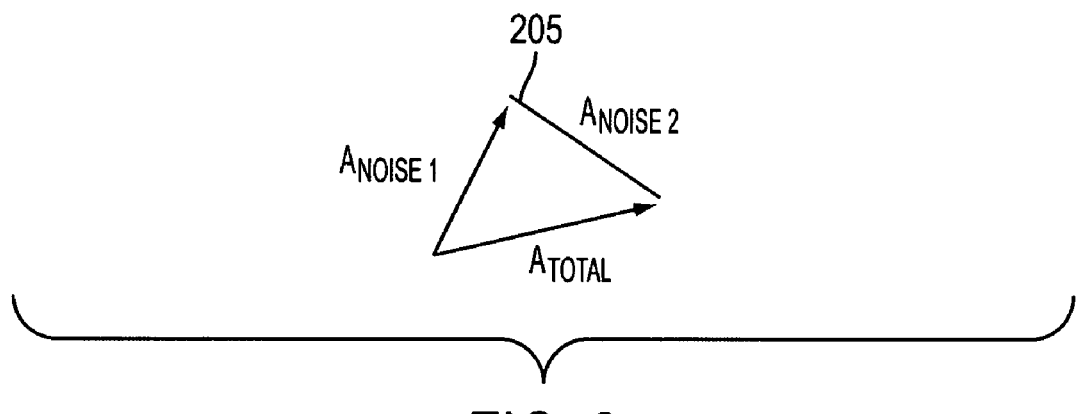

Referring to FIG. 2 illustrates a graphical representation with equation specifications 200 of the superposition of two uncorrelated noises for automatic grainy noise control and for optimal macro uniformity appearance in which a preferred embodiment can be implemented. Image noises 201 are superimposed in a pixel by pixel manor, namely $Noise_1 + Noise_2 = Noise_{total}$ Because the peaks and valleys of uncorrelated noises from two sources are randomly matched 201, the RMS (Root Mean Square) amplitudes of the noises $A_{noise\ 1}$ and $A_{noise\ 2}$ do not sum up linearly. Instead, the power of additional noise is the difference between the power of the optimal noise and the power of the intrinsic noise 202, that is $A_{noise\ 1}^2 + A_{noise\ 2}^2 = A_{total}^2$. The amplitude of the noise needed for injection can then be derived. Due to the fact that the required noise amplitude is changing while the system is printing as indicated in 205, this automatic noise adjustment feedback feed forward approach can have some system architecture implications.

Figure 3:
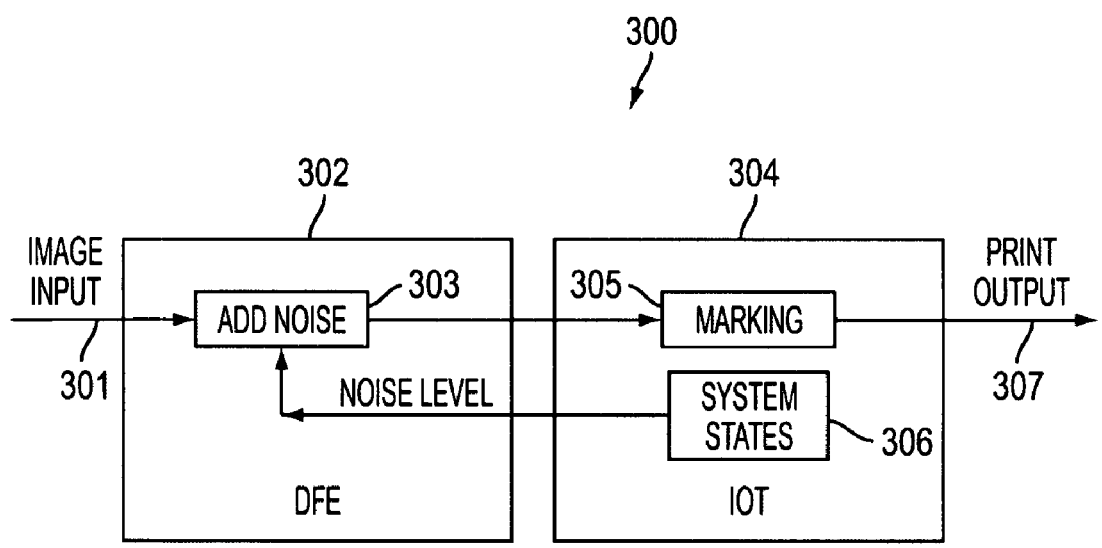
FIG. 3 illustrates a block diagram of the process of implementing noise injection through image modification for automatic grainy noise control for optimal macro uniformity appearance in which a preferred embodiment can be implemented.

Referring to FIG. 3, illustrated is a block diagram 300 showing the implementation of noise injection through image modification for automatic grainy noise control and for optimal macro uniformity appearance. This is done typically in the digital front end (DFE) 302. The image input 301 is sent to the DFE in which the noise adding module 303 is present. The marking engine 305 in the image output terminal (IOT) 304 is configured with the DFE 302. If the IOT 304 state change causes the noise injection level change, the IOT would have to communicate with the DFE 302 based on the system states 306. The DFE 302 will need to respond accordingly, such as by re-ripping the image with new noise levels for forming the print output 307.

Figure 4:
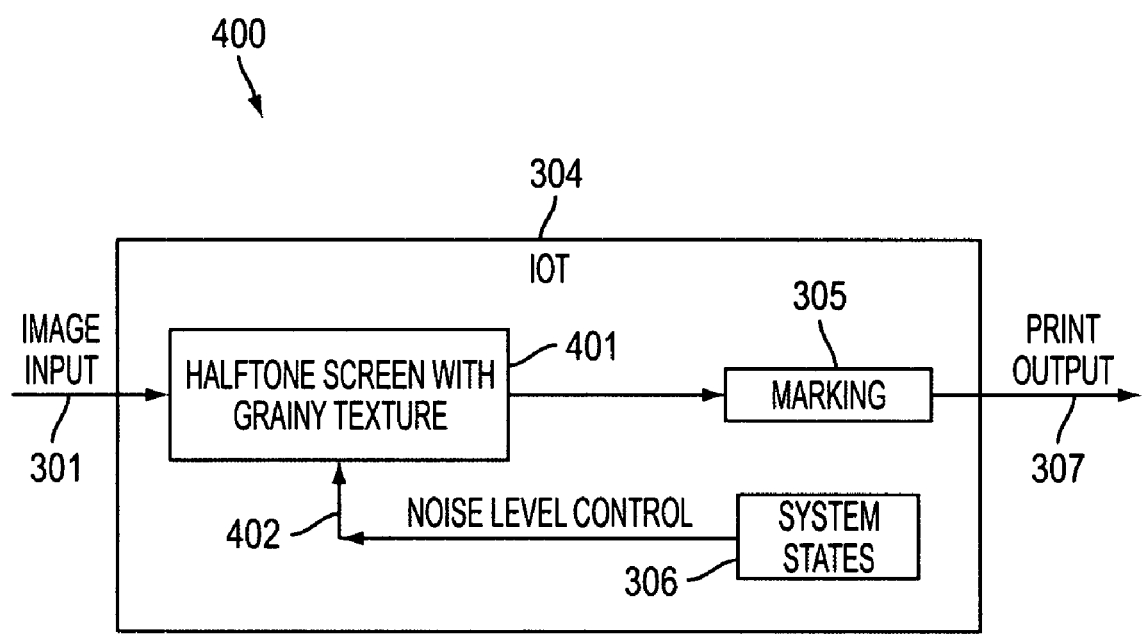
FIG. 4 illustrates a block diagram for a method that shows the implementation of noise injection through textured halftone screen for automatic grainy noise control for optimal macro uniformity appearance in which a preferred embodiment can be implemented.

Referring to FIG. 4, illustrates a block diagram 400 showing the implementation of noise injection through textured halftone screens for automatic grainy noise control and for optimal macro uniformity appearance. The input image 301 is sent to the HT screen with grainy texture 401 that is present in the IOT 304, and is configured with the marking engine 305. A quick way to generate a halftone screen with a new noise level 402 is preferred. The noise amplitude can be adjusted easily without the base halftone redesign and has very little system interactions, e.g., such as with tone-reproduction curves (TRCs), color look-up tables (LUTs), etc. This screen level noise change can be applied through a machine IQ adjustment cycle since many of the current electrostatic printing systems have already implemented some IQ related actuator changes in response to the system state 306 changes for forming the print output 307.

Figure 5:
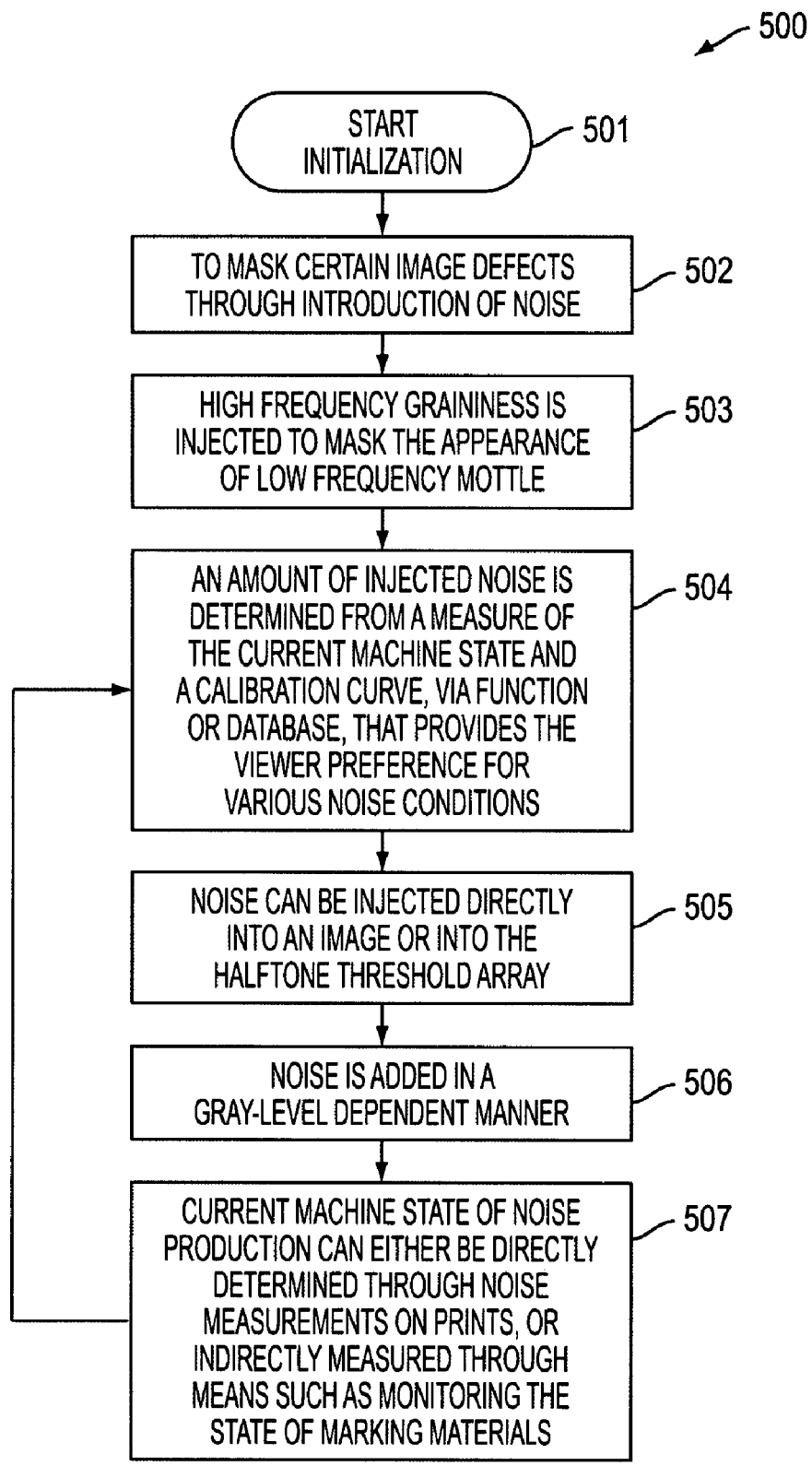
FIG. 5 illustrates a block diagram of a high level flowchart for the process events taking place for automatic grainy noise control for optimal macro uniformity appearance in which a preferred embodiment can be implemented.

Referring to FIG. 5, a block diagram 500 illustrates a high level flowchart of process events taking place for automatic grainy noise control for optimal macro uniformity appearance. Process initialization occurs as shown in Block 501. Next, certain image defects are masked through the introduction of noise as shown in Block 502. High frequency graininess is injected to mask the appearance of low frequency mottle as indicated in Block 503. The amount of injected noise is determined from a measure of the current machine state (of noise production) and a calibration curve, via function or database, that provides the viewer preference for various noise conditions as described at block 504. Such a calibration can be determined, for example, in a survey process. Thereafter as depicted in block 505, the noise can be injected directly into an image, or into the halftone threshold array wherein the noise is added in a gray-level dependent manner as indicated in block 506. The current machine state of noise production can either be directly determined through noise measurements on prints, or indirectly measured, through means such as monitoring the state of marking materials as described in block 507. This measurement of machine state of noise production is feedback into the noise addition estimation block 504.

Figure 6:
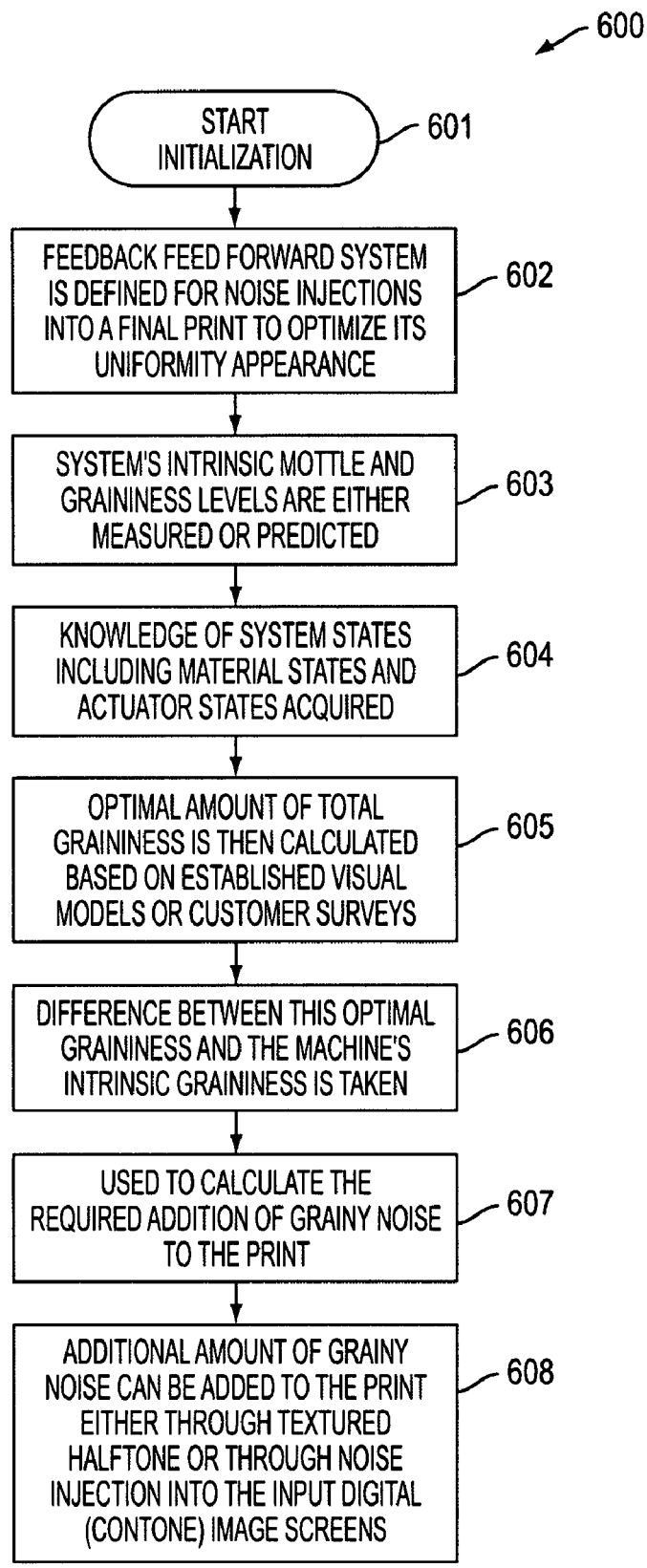
FIG. 6 illustrates a block diagram that shows a high level flowchart for the working procedure for automatic grainy noise control for optimal macro uniformity appearance in which a preferred embodiment can be implemented.

Referring to FIG. 6, a high level flowchart 600 is illustrated for working procedure in automatic grainy noise control for optimal macro uniformity appearance. As depicted at 601, initialization can occur. To achieve the best uniformity appearance, an optimal balance between graininess and mottle can be achieved. With a certain amount of mottle noise, too little or too much grainy noise will make the appearance less preferable compare to the optimally balanced case. The optimal amplitude of the grainy noise needed on a print depends on the amplitude of the mottle noise. The higher the mottle noise, the greater the amount of grainy noise that can be required. A feedback feed-forward system can provide for noise injection into a final print to optimize its uniformity appearance as indicated in block 602. Such a system can show significant variation in its performance. A large range of mottle performance (noise level can vary by more than 70%) is possible, depending on the system (machine & material) states. The system's intrinsic mottle & graininess levels are either measurable as described in block 603 or can be predicted based on the knowledge of system states including material states and actuator states as indicated in block 604.

Following processing of the operation depicted at block 605, a system's intrinsic and graininess levels are either measured or predicted based on the knowledge of system states including material states and actuator states, whereafter the optimal amount of total graininess can then be calculated based on established visual models or customer surveys and then generally by taking the difference between the optimal graininess and the machine's intrinsic graininess as indicated in block 606 and using the difference to calculate the required addition of grainy noise to the print as depicted in block 607. The additional amount of grainy noise can then be added to the print either through textured halftone screens or through noise injection into the input digital (contone) image as described in block 608.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method implemented in a digital image processing system achieving automatic grainy noise control for optimal macro uniformity appearance, comprising:
   determining intrinsic mottle and graininess levels of digital image data;
   determining optimal graininess level for said digital image based on established visual models;
   determining additional grainy noise based on a calculated difference between said intrinsic mottle and graininess levels and said optimal graininess levels;
   injecting said additional grainy noise into said image data to optimize uniform appearance of a print; and
   outputting said print using said digital image data injected with said image data.

2. The method of claim 1 wherein said additional grainy noise is determined by subtracting said intrinsic graininess level from said optimal graininess level.

3. The method of claim 1 wherein said intrinsic mottle and graininess level can be determined by obtaining it through an image generation model.

4. The method of claim 1 wherein said optimal graininess level can be determined by obtaining it through customer surveys stored in a database of said digital image processing system.

5. The method of claim 1 wherein the difference between optimal graininess and a device's intrinsic graininess is used to calculate the required addition of grainy noise to the print.

6. A system for providing automatic grainy noise control for optimal macro uniformity appearance, comprising:
   input digital image data;
   a digital front end for communication with an image output terminal, said digital front end being configured to receive said input digital image data;
   a memory unit having customer surveys and at least one visual model stored therein for obtaining optimal graininess level;
   a noise adding module configured to:
   determine intrinsic mottle and graininess levels of a digital image;
   determine optimal graininess level based on said visual model(s) and/or said customer surveys;
   determine additional grainy noise based on a calculated difference between said intrinsic mottle and graininess levels and said optimal graininess levels; and
   input said additional grainy noise into said digital image.

7. The system of claim 6 wherein said intrinsic mottle and graininess levels are at least measured based on the knowledge of system states including material sates and actuator states.

8. The system of claim 6 wherein said difference between the optimal graininess and the machines intrinsic graininess is determined and then used to enhance the input image.

9. A method implemented in a digital image processing system to mask image defects through introduction of noise, comprising:
   determining an amount of high frequency graininess can be injected into an image by at least one of: measuring current machine states resulting in noise production, or retrieving graininess information stored in a database of said digital image printer system providing a user various noise conditions preference; and
   injecting high frequency graininess into said image to mask the appearance of low frequency mottle.

10. The method of claim 9 wherein the amount of high frequency graininess stored in the said database is determined from a survey process.

11. The method of claim 9 wherein said high frequency graininess is provided in the form of noise injected directly into an image.

12. The method of claim 9 wherein said high frequency graininess is provided in the form of noise injected directly into the halftone threshold array.

13. The method of claim 12 wherein the noise is added in a gray-level dependent manner.

14. The method of claim 9 wherein the measurement of current machine states is of noise production and is directly determined through noise measurements obtained from prints.

15. The method of claim 9 wherein the measurement of current machine states is of noise production and is indirectly measured by monitoring the state of marking materials.

* * * * *